United States Patent
Burris et al.

(10) Patent No.: US 9,887,522 B2
(45) Date of Patent: Feb. 6, 2018

(54) STRIPPING TOOLS AND METHODS FOR PREPARING COAXIAL CABLES

(71) Applicant: CORNING OPTICAL COMMUNICATIONS RF LLC, Glendale, AZ (US)

(72) Inventors: Donald Andrew Burris, Peoria, AZ (US); Guy Joachin Castonguay, Peoria, AZ (US); Thomas Dewey Miller, Peoria, AZ (US)

(73) Assignee: CORNING OPTICAL COMMUNICATIONS RF LLC, Glendale, AZ (US)

( * ) Notice: Subject to any disclaimer, the term of this patent is extended or adjusted under 35 U.S.C. 154(b) by 361 days.

(21) Appl. No.: 14/812,486

(22) Filed: Jul. 29, 2015

(65) Prior Publication Data
US 2016/0036207 A1 Feb. 4, 2016

Related U.S. Application Data

(60) Provisional application No. 62/030,855, filed on Jul. 30, 2014.

(51) Int. Cl.
*H02G 1/12* (2006.01)

(52) U.S. Cl.
CPC ......... *H02G 1/1224* (2013.01); *H02G 1/1236* (2013.01)

(58) Field of Classification Search
CPC ...... H02G 1/1224; H02G 1/1236; H02G 1/12; H02G 1/1202; H02G 1/1204; H02G 1/1207; H02G 1/1209; H02G 1/1212; H02G 1/1234; H02G 1/1221; H02G 1/1219; H02G 1/1229
USPC .................... 30/90.1, 90.2; 81/9.4, 9.41–9.44
See application file for complete search history.

(56) References Cited

U.S. PATENT DOCUMENTS

| | | | |
|---|---|---|---|
| 4,829,671 A | 5/1989 | Cheng | |
| 5,033,335 A * | 7/1991 | Yatsu | G02B 6/245 81/9.4 |
| 5,036,734 A | 8/1991 | Morrow | |
| 5,150,522 A | 9/1992 | Gwo-Jiang | |
| 5,435,029 A | 7/1995 | Carlson, Jr. et al. | |
| 5,491,894 A | 2/1996 | Bieganski | |
| 5,713,132 A | 2/1998 | Tarpill | |
| 5,713,249 A * | 2/1998 | Liversidge | H02G 1/1212 81/9.41 |
| 5,724,871 A | 3/1998 | Wall | |
| 6,128,976 A | 10/2000 | Tarpill | |

(Continued)

*Primary Examiner* — Phong Nguyen
(74) *Attorney, Agent, or Firm* — Brad C. Rametta

(57) ABSTRACT

A stripping tool includes and body portion and a clamping arm. The stripping tool further includes a stripping blade having a blade edge. The stripping blade extends from the body portion, and the blade edge is offset from the clamping arm at a distance d such that the blade edge enters the insulator layer of the coaxial cable when the coaxial cable is positioned between the clamping arm and the body portion. The stripping tool further includes a retention element disposed at the body portion at a position after the stripping blade along a cable insertion direction. The retention element is positioned to contact the outer layer of an end portion of the coaxial cable when the coaxial cable is positioned between the clamping arm and the body portion and the stripping tool is in the closed position.

19 Claims, 6 Drawing Sheets

(56) References Cited

U.S. PATENT DOCUMENTS

| | | |
|---|---|---|
| 6,505,399 B2 | 1/2003 | Lo et al. |
| 7,216,431 B2 | 5/2007 | Holliday et al. |
| 7,694,420 B2 | 4/2010 | Ehret et al. |
| 2011/0192033 A1* | 8/2011 | Kasprzycki .......... H02G 1/1224 30/91.2 |
| 2014/0090538 A1* | 4/2014 | Makrides-Saravanos .............. G02B 6/245 83/861 |

* cited by examiner

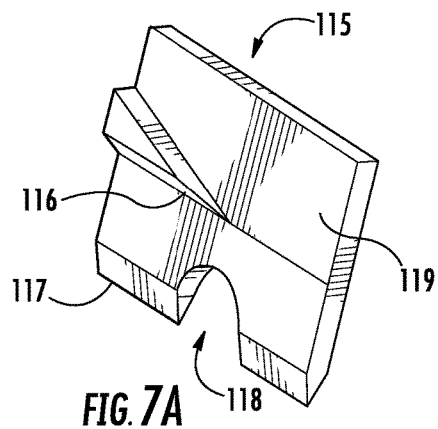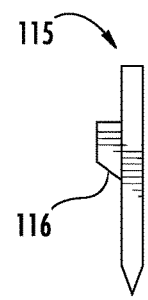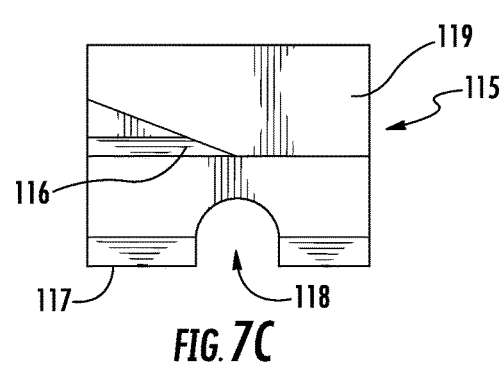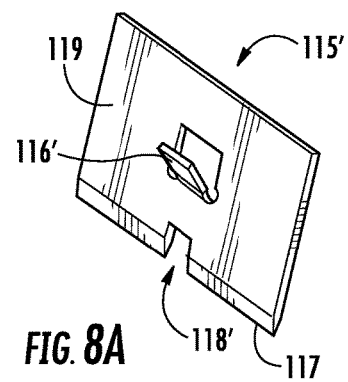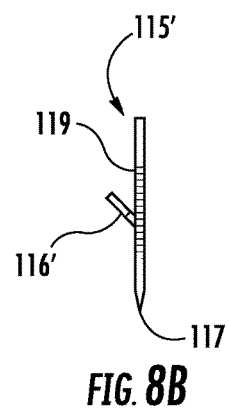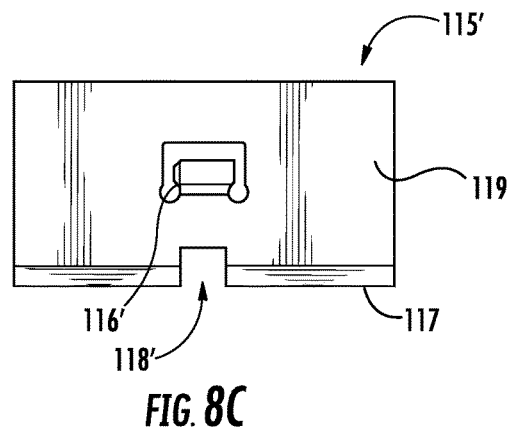

STRIPPING TOOLS AND METHODS FOR PREPARING COAXIAL CABLES

PRIORITY APPLICATION

This application claims the benefit of priority under 35 U.S.C. § 119 of U.S. Provisional Application Ser. No. 62/030,855 filed on Jul. 30, 2014 the content of which is relied upon and incorporated herein by reference in its entirety.

BACKGROUND

The present disclosure relates generally to preparation of coaxial cables for coaxial cable connectors, and, more particularly, to tools and methods for preparation of coaxial cables without exposing the braided outer conductor of the coaxial cables.

Coaxial cable connectors, such as F-connectors, are used to attach coaxial cables to another object such as an appliance or junction having a terminal adapted to engage the connector. For example, F-connectors are often used to terminate a drop cable in a cable television system. The coaxial cable typically includes an inner conductor surrounded by a dielectric layer, which is in turn surrounded by a conductive grounding foil and/or braid defining a conductive grounding sheath. The conductive grounding sheath is itself surrounded by a protective outer jacket. The F-connector is typically secured over the prepared end of the jacketed coaxial cable, allowing the end of the coaxial cable to be connected with a terminal block, such as by a threaded connection with a threaded terminal of a terminal block.

Currently, the coaxial cable is prepared by removing a portion of the outer jacket, and flaring and folding the outer braid back over the outer jacket. However, the step of flaring and folding the outer braid over the outer jacket is a time consuming and difficult process. Further, small fragments of the outer braid may break off. These small fragments may cause electrical shorts in nearby electrical systems and/or enter the skin of cable installer.

Accordingly, alternative stripping tools and methods for preparing coaxial cables for connectors may be desired.

SUMMARY

Embodiments of the present disclosure are directed to stripping tools and methods for preparing a coaxial cable for receiving a connector, such as an F-connector, for example. The stripping tools and methods described herein eliminate the need to flare and peel back the braided outer conductor layer over the outer layer after the stripping process and before securing a connector. In some embodiments, a chamfer may be formed in the outer layer.

In one embodiment, a stripping tool for stripping a coaxial cable having an inner conductor, an insulator layer surrounding the inner conductor, a braided outer conductor layer surrounding the insulator layer, and an outer layer surrounding the braided outer conductor layer includes and body portion and a clamping arm. The body portion has a stripping end, and the clamping arm is rotatably coupled to the body portion such that the clamping arm is biased in a normally closed position with respect to the body portion. The stripping tool further includes a stripping blade having a blade edge. The stripping blade extends from the body portion at the stripping end in a direction toward the clamping arm, and the blade edge is offset from the clamping arm at a distance d such that the blade edge enters the insulator layer of the coaxial cable when the coaxial cable is positioned between the clamping arm and the body portion and the stripping tool is in a closed position. The stripping tool further includes a retention element disposed at the body portion at a position after the stripping blade along a cable insertion direction. The retention element and the clamping arm define a channel when the stripping tool is in the closed position. The retention element is positioned to contact the outer layer of an end portion of the coaxial cable when the coaxial cable is positioned between the clamping arm and the body portion and the stripping tool is in the closed position such that the retention element prevents rotation of the end portion of the coaxial cable as the stripping tool is rotated about the coaxial cable.

In another embodiment, a stripping tool for stripping a coaxial cable having an inner conductor, an insulator layer surrounding the inner conductor, a braided outer conductor layer surrounding the insulator layer, and an outer layer surrounding the braided outer conductor layer includes a body portion and a clamping arm. The body portion has a stripping end, and the clamping arm is rotatably coupled to the body portion such that the clamping arm is biased in a normally closed position with respect to the body portion. The stripping tool further includes an insert removably coupled to the body portion at the stripping end. The insert includes a stripping blade and a retention pad. The stripping blade extends toward the clamping arm such that a blade edge is offset from the clamping arm at a distance d and the blade edge enters the insulator layer of the coaxial cable when the coaxial cable is positioned between the clamping arm and the body portion and the stripping tool is in a closed position. The retention pad is disposed at the body portion at a position after the stripping blade along a cable insertion direction. The retention pad is curved, and the retention pad and the clamping arm define a channel when the stripping tool is in the closed position. The retention pad is positioned within the insert to contact the outer layer of an end portion of the coaxial cable when the coaxial cable is positioned between the clamping arm and the body portion and the stripping tool is in the closed position such that the retention pad prevents rotation of the end portion of the coaxial cable within the stripping tool and a bond between the insulator layer and the inner conductor is broken as the stripping tool is rotated about the coaxial cable.

In yet another embodiment, a method of stripping a coaxial cable having an inner conductor, an insulator layer surrounding the inner conductor, a braided outer conductor layer surrounding the insulator layer, and an outer layer surrounding the braided outer conductor layer includes positioning the coaxial cable between a clamping arm and a body portion of a stripping tool such that a stripping blade enters the insulator layer, wherein the coaxial cable has an end portion between an end of the coaxial cable and the stripping blade. The method further includes rotating the stripping tool about the coaxial cable while preventing rotation of the end portion of the coaxial cable within the stripping tool such that a bond between the insulator layer and the inner conductor is broken, and the stripping blade circumferentially severs the outer layer, the braided outer conductor layer, and the insulator layer. The method further includes separating an end remnant of the coaxial cable from the coaxial cable to expose the inner conductor for a length, wherein the end remnant includes the outer layer, the braided outer conductor layer, and the insulator layer of the end portion.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate embodiments, and together with the description serve to explain principles and operation of the various embodiments.

The accompanying drawings are included to provide a further understanding, and are incorporated in and constitute a part of this specification. The drawings illustrate one or more embodiment(s), and together with the description serve to explain principles and operation of the various embodiments.

BRIEF DESCRIPTION OF THE DRAWINGS

FIG. 7A schematically depicts a perspective view of a stripping blade having an angled blade to form a chamfer in an outer layer of a coaxial cable according to one or more embodiments described and illustrated herein;

FIG. 7B schematically depicts a side view of the stripping blade depicted in FIG. 7A;

FIG. 7C schematically depicts a front view of the stripping blade depicted in FIGS. 7A and 7B;

FIG. 8A schematically depicts a perspective view of a stripping blade having an angled portion to form a chamfer in an outer layer of a coaxial cable according to one or more embodiments described and illustrated herein;

FIG. 8B schematically depicts a side view of the stripping blade depicted in FIG. 8A;

FIG. 8C schematically depicts a front view of the stripping blade depicted in FIGS. 8A and 8B;

DETAILED DESCRIPTION

Embodiments of the present disclosure are directed to tools and methods for stripping a coaxial cable having an inner conductor, an insulator layer surrounding the inner conductor, a braided outer conductor layer surrounding the insulator layer, and an outer layer surrounding the braided outer conductor layer. Embodiments described herein enable fully stripping and preparing an end of the coaxial cable without needing to fold back the braided outer conductor layer over the outer layer (i.e., the cable jacket). More specifically, the embodiments described herein provide for forming a stripped portion of the coaxial cable wherein the outer layer, the braided outer conductor layer, and the insulator layer (as well as any intermediary layers, such as a metal foil layer disposed between the insulator layer and the braided outer conductor layer) are removed, thereby exposing the inner conductor. Various embodiments of tools and methods for stripping a coaxial cable are described in detail below.

Figure 1A:
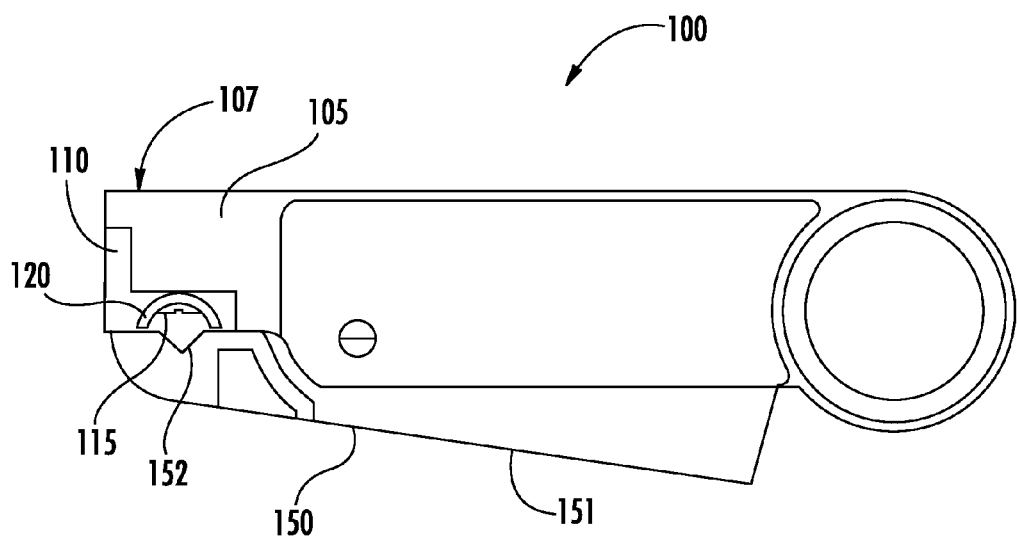
FIG. 1A schematically depicts a schematic side view of a stripping tool in a closed position according to one or more embodiments described and illustrated herein.
Figure 1B:
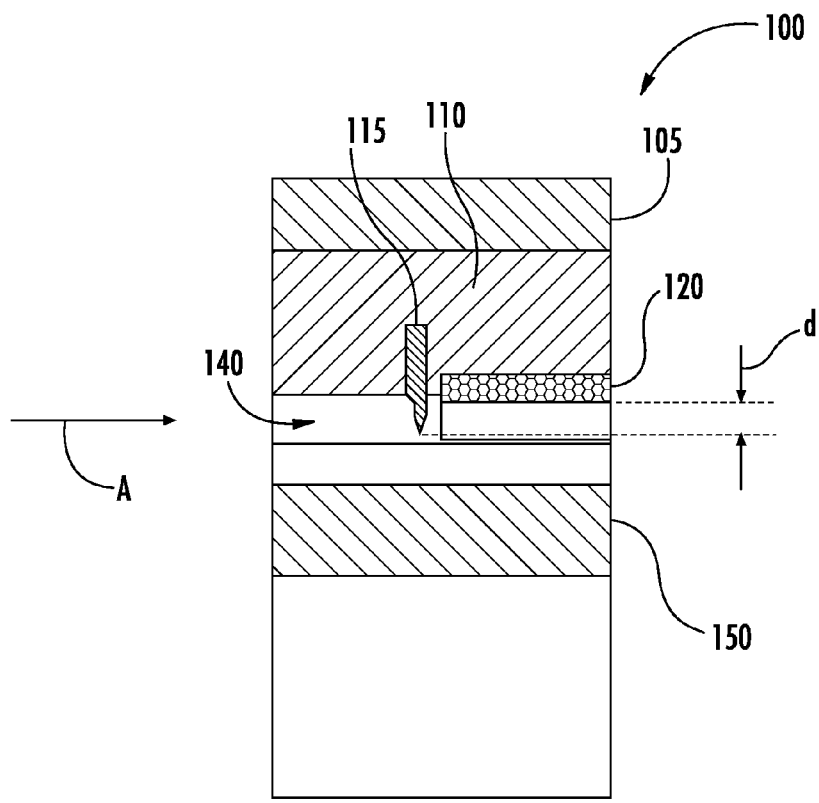
FIG. 1B schematically depicts a partial cross section view of a stripping end of the stripping tool depicted in FIG. 1A according to one or more embodiments described and illustrated herein.

Referring now to FIGS. 1A and 1B, an example stripping tool 100 for stripping a coaxial cable is schematically illustrated. FIG. 1A is a side view of the stripping tool 100, while FIG. 1B is a partial cross sectional end view of the stripping tool illustrated in FIG. 1A. The example stripping tool 100 generally comprises a body portion 105 and a clamping arm 150. The clamping arm 150 is rotatably coupled to the body portion 105 such that it is biased in a normally closed position as illustrated in FIG. 1A. The clamping arm 150 may be biased in the closed position by use of a spring assembly (not shown), for example, or by any other biasing method. A gripping force applied by a user's hand on a handle portion 151 of the clamping arm 150 opens the stripping tool 100 to provide for acceptance of a coaxial cable, as described in more detail below.

The body portion 105 has a stripping end 107 in which a stripping blade 115 and a retention element 120 are disposed. In the illustrated embodiment, the stripping blade 115 and the retention element 120 are provided in an insert 110 that is removably coupled to the body portion 105 at the stripping end 107. The insert 110 may be removably coupled to the body portion 105 by any method (e.g., snap fit, use of fasteners, and the like). Providing the stripping blade 115 and the retention element 120 in the insert 110 allows a user to readily change the stripping blade 115 and the retention element 120 in the event they become worn and need replaced. It should be understood that, in other embodiments, the stripping blade 115 and the retention element 120 are permanently attached to the body portion 105 (i.e., integral with the body portion 105) and not provided in an insert.

As shown in FIG. 1B, the retention element 120 is disposed within the insert 110 at a location that is after the stripping blade 115 along a coaxial cable insertion direction labeled as arrow A. Accordingly, as described in more detail below, the retention element 120 holds an end portion of the coaxial cable when the coaxial cable is disposed within the stripping tool 100.

In the illustrated example, the retention element 120 is curved and forms a channel 140 along with the clamping arm 150 when the stripping tool 100 is in the closed position. The retention element 120 may have a radius that is equal to or less than a radius of the coaxial cable intended to be cut. The retention element 120 of the illustrated embodiment is configured as a pad 120 having a high coefficient of friction and compressible properties (i.e., a pliable material) that provides gripping/non-slip characteristics when applied against other plastic materials, such as the polyvinyl chloride ("PVC") of the outer layer of the coaxial cable. The material chosen for the pad 120 should have a coefficient of friction with respect to the outer layer 1050 of the coaxial cable 1000 (see FIG. 2B) such that the portion of the coaxial cable 1000 held by the pad 120 does not rotate as the stripping tool 100 is rotated about the coaxial cable 1000. In one embodiment, the pad 120 is made from a rubber-like material such as reinforced silicon.

The stripping blade 115 may be made from any suitable material, such as steel, for example. As shown in FIG. 1B, the stripping blade 115 extends from an upper surface of the insert 110 (or the body portion 105 in embodiments that do not utilize an insert) and into the channel 140 at a distance d.

In the illustrated embodiment, the clamping arm 150 comprises a groove 152 that is aligned within the retention element 120 when the stripping tool 100 is in a closed position, and is configured to receive a coaxial cable. The example groove 152 depicted in FIG. 1B is "V" shaped; however, embodiments are not limited thereto. In alternative embodiments, the clamping arm 150 does not include a groove.

Figure 2A:
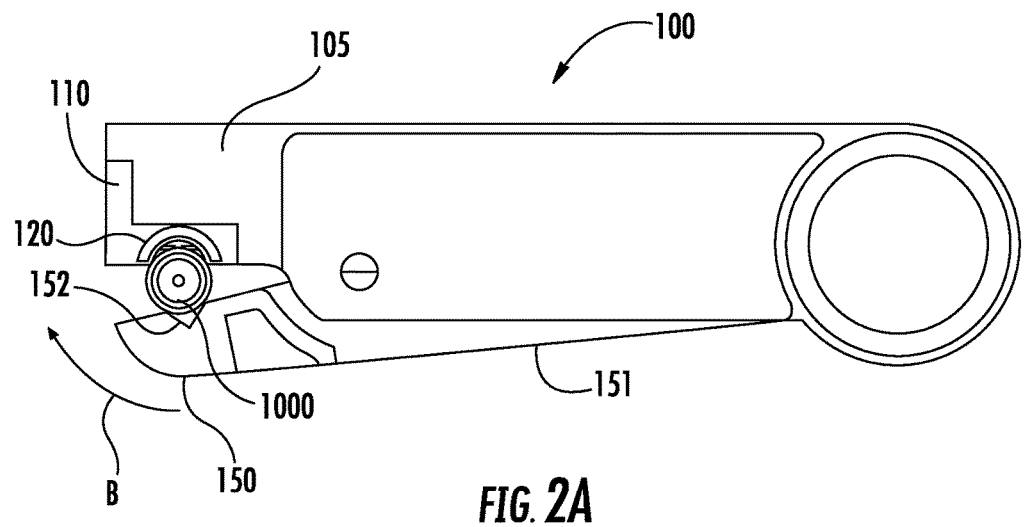
FIG. 2A schematically depicts a schematic side view of the stripping tool depicted in FIG. 1A in an open position with a coaxial cable positioned on the clamping arm according to one or more embodiments described and illustrated herein.
Figure 2B:
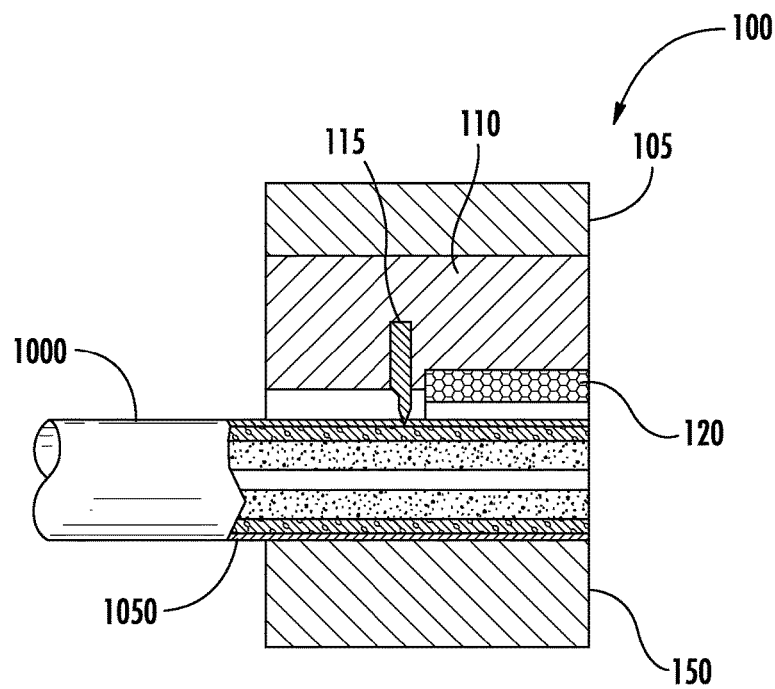
FIG. 2B schematically depicts a cross section view of the stripping end of the stripping tool depicted in FIGS. 1A and 1B with a coaxial cable disposed therein according to one or more embodiments described and illustrated herein.

FIGS. 2A and 2B illustrate the stripping tool 100 of FIGS. 1A and 1B in an open position and with a coaxial cable 1000 inserted therein. Release of a force on the handle portion 151 of the clamping arm 150 causes the clamping arm 150 to rotate and transition the stripping tool 100 to a closed position as is illustrated by arrow B in FIG. 2A.

Figure 3:
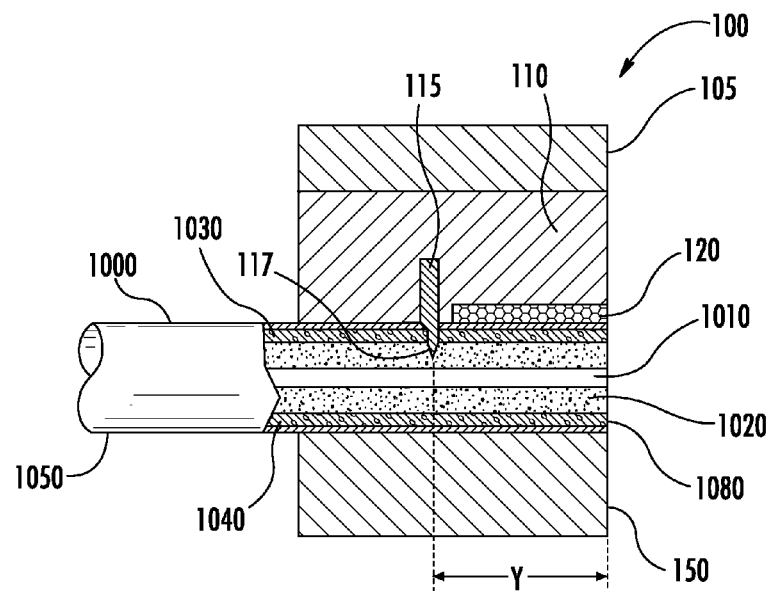
FIG. 3 schematically depicts a partial cross section view of the stripping end of the stripping tool illustrated in FIGS. 1A and 1B and a coaxial cable partially cut by a stripping blade according to one or more embodiments described and illustrated herein.

FIG. 3 depicts a close-up cross sectional view of a coaxial cable 1000 disposed within stripping tool 100 when the stripping tool 100 is in the closed position. The coaxial cable 1000 comprises an inner conductor 1010, an insulator layer 1020 surrounding the inner conductor 1010, a braided outer conductor layer 1040, and an outer layer 1050 surrounding the braided outer conductor layer 1040. In some embodiments, a metal foil layer 1030 may be disposed between the insulator layer 1020 and the braided outer conductor layer 1040. A blade edge 117 of the stripping blade 115 is set at a position such that is severs the outer layer 1050, the braided outer conductor layer 1040, and the metal foil layer 1030 (if present), and is disposed within the insulator layer 1020. The blade edge 117 does not contact the inner conductor 1010. The stripping blade 115 is set at a position such that a certain amount of the inner conductor 1010 will be exposed following the stripping process. Seen as dimension Y in FIG. 3, the length of inner conductor 1010 may be any desired length. As one non-limiting example, the dimension Y may be about 13 millimeters.

After the coaxial cable 1000 is disposed between the clamping arm 150 and the body portion 105 and the stripping blade 115 is within the insulator layer 1020, the user rotates the stripping tool 100 around the coaxial cable 1000. The rotation of stripping tool 100 combined with a clamping spring force exerted by the stripping tool 100 causes the stripping blade 115 to circumferentially cut into the coaxial cable 1000. As the stripping tool 100 is rotated about coaxial cable 1000, the retention element 120 is held radially away from outer layer 1050 (i.e., the cable jacket) by the blade edge 117 of the stripping blade 115 against the outer layer 1050.

As seen in FIG. 3 and stated above, the stripping blade 115 circumferentially cuts through the outer layer 1050 as the stripping tool 100 is further rotated. As the stripping blade 115 advances in the direction of the inner conductor 1010, the retention element 120 (e.g., the pad 120) contacts what will become the cable remnant 1080 at the outer surface of the outer layer 1050. The retention element 120 prevents rotation of the coaxial cable 1000 within the stripping tool 100 at the location which will become the cable remnant 1080 and thereby imparts a twisting action to the cable remnant 1080. This causes the bond between the insulator layer 1020 and the inner conductor 1010 to radially break.

Figure 4:
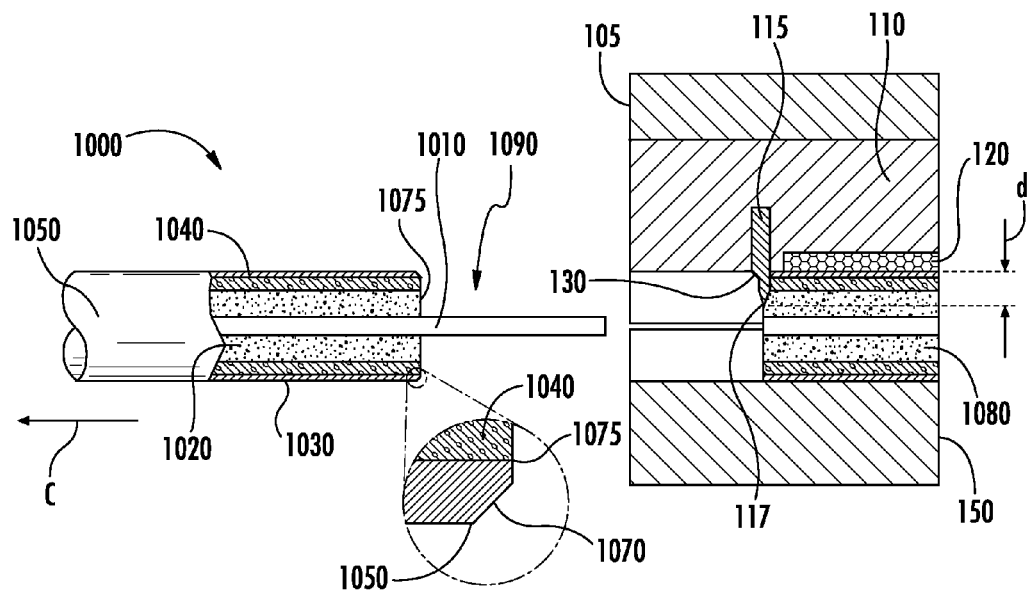
FIG. 4 schematically depicts a partial cross section view of the stripping end of the stripping tool illustrated in FIGS. 1A and 1B, a stripped coaxial cable removed from the stripping tool, and a cable remnant within the stripping tool according to one or more embodiments described and illustrated herein.

The broken bond between the insulator layer 1020 and the inner conductor 1010 allows for the coaxial cable 1000 to be easily withdrawn from the stripping tool 100 by pulling the coaxial cable 1000 in the direction indicated by arrow B. As shown in FIG. 4, this action leaves cable remnant 1080 within the stripping tool 100. As such, withdrawing the coaxial cable 1000 from the stripping tool 100 in the direction of arrow B causes cable remnant 1080 to separate from coaxial cable 1000. The cable remnant 1080 includes an insulator layer 1020, a metal foil layer 1030 (if provided), a braided outer conductor layer 1040, and an outer layer 1050. At least a portion of inner conductor 1010 of the coaxial cable 1000 (i.e., a stripped portion 1090) is therefore exposed following an end face 1075 of the insulator layer 1020, the metal foil layer (if provided), the braided outer conductor layer 1040, and the outer layer 1050.

As shown in FIG. 4 and described in more detail below, in some embodiments the stripping blade 115 may be configured to cut a chamfer 1070 into the outer layer 1050. The chamfer 1070 may be beneficial when installing a cable connector on the stripped coaxial cable 1000.

Figure 5:
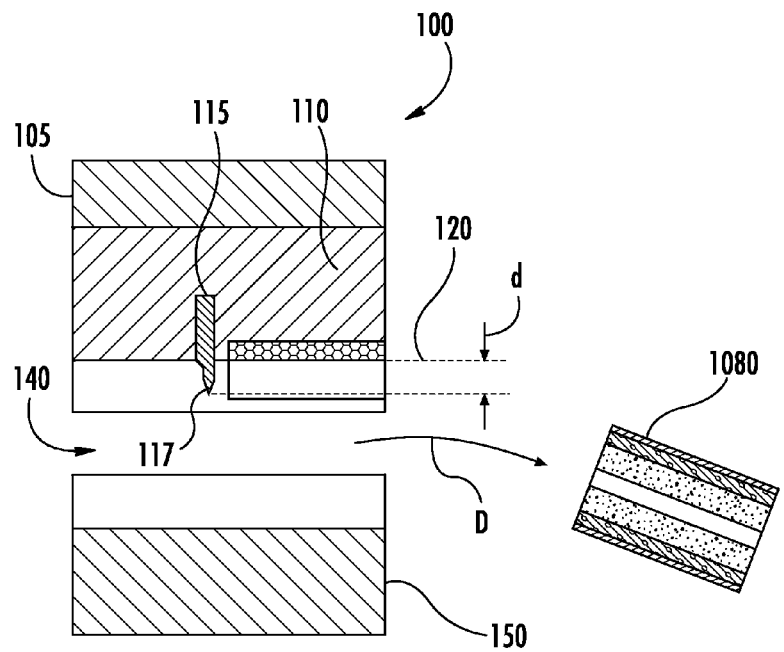
FIG. 5 schematically depicts a partial cross section view of the stripping end of the stripping tool illustrated in FIGS. 1A and 1B in an open position and the cable remnant extracted from the stripping tool according to one or more embodiments described and illustrated herein.
Figure 6:
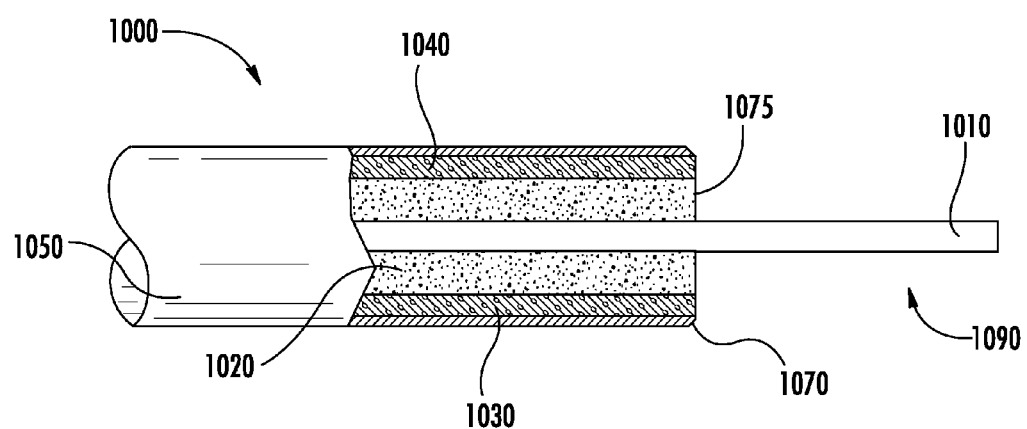
FIG. 6 schematically depicts a partial cross section view of a coaxial cable following the cable stripping process according to one or more embodiments described and illustrated herein.

FIG. 5 schematically depicts the removal of the cable remnant 1080 from the stripping tool in partial cross section. The user applies a gripping force to the handle portion 151 of the clamping arm 150 (see FIG. 1A) to open the clamping arm 150 with respect to the insert 110. The cable remnant 1080 may then be extracted from the stripping tool 100 as indicated by arrow D. FIG. 6 is a partial cross sectional view of a coaxial cable 1000 having a stripped portion 1090 prepared with the stripping tool 100 as described above. The inner conductor 1010 is exposed in the stripped portion 1090 and the outer layer 1050 comprises a chamfer 1070.

FIGS. 7A-7C schematically depict various views of an example stripping blade 115 configured to produce a chamfer 1070 in the outer layer 1050 of a coaxial cable 1000. The example stripping blade 115 includes a chamfer feature configured as an angled blade 116 extending from a face 119. The angled blade 116 is operable to form a chamfer 1070 in the outer layer 1050 of the coaxial cable 1000 as the stripping tool is rotated about the coaxial cable 1000. In the illustrated embodiment, the angled blade 116 cuts into the outer layer 1050 to form the chamfer 1070. The illustrated stripping blade 115 further includes a central notch 118 at the blade edge 117 to ensure that the stripping blade 115 does not contact the inner conductor 1010.

Other configurations of the stripping blade that are operable to form the chamfer 1070 may be utilized. FIGS. 8A-8C schematically depict various views of an alternative stripping blade 115' for stripping the coaxial cable 1000 and forming a chamfer 1070 in the outer layer 1050. The example stripping blade 115' comprises an angled portion 116' that extends from a face 119 of the stripping blade 115'. The angled portion 116' is configured as an angled tab of face 119. The angled portion 116' cuts into the outer layer 1050 and forms the chamfer 1070 as the stripping blade 115' forms the cable remnant 1080. The illustrated stripping blade 115' further includes a central notch 118' at the blade edge 117 to ensure that the stripping blade 115' does not contact the inner conductor 1010.

Figure 9:
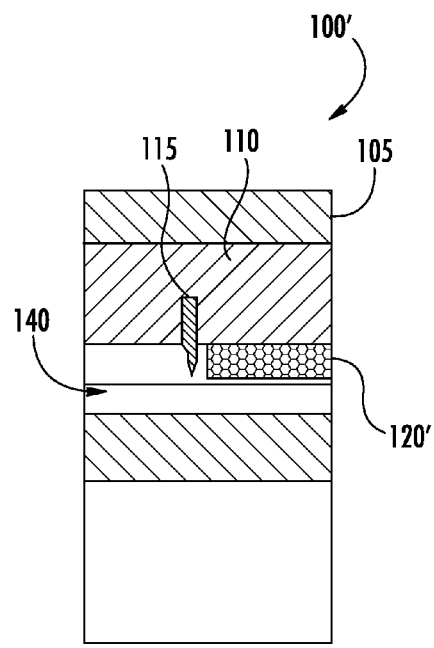
FIG. 9 schematically depicts a partial cross section view of a stripping end of a stripping tool having a retention element configured as a textured surface according to one or more embodiments described and illustrated herein.

The retention element 120 may take on forms other than the pad described above and illustrated in FIGS. 1A-5. The retention element 120 may be configured as any feature(s) capable of preventing the end portion that will become the cable remnant 1080 of the coaxial cable 1000 from rotating within the stripping tool 100 as the stripping tool 100 is rotated about the coaxial cable 1000. Referring now to FIG. 9, a stripping tool 100' comprising a textured portion 120' as the retention element is schematically depicted in cross section. The textured portion 120' may be used in place of the pad 120 to increase friction on the outer layer 1050 of the coaxial cable and impart a twisting action to cable remnant 1080, thereby causing the insulator layer 1020 to radially break the bond between insulator layer 1020 and the inner conductor 1010 as described above. As an example, the textured portion 120' may be formed into the surface of the insert 110. As a non-limiting example, the textured portion 120' may be in the form of a diamond knurl pattern.

Figure 10A:
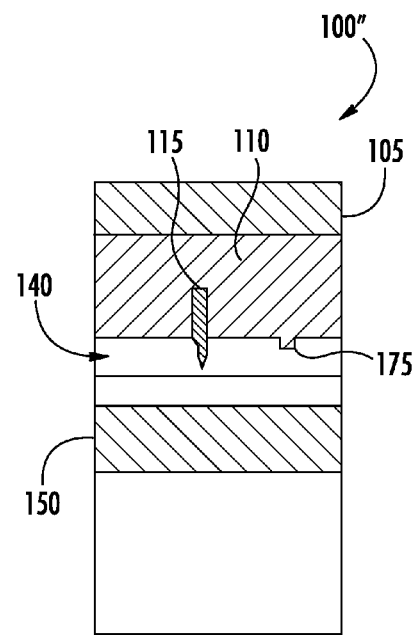
FIG. 10A schematically depicts a partial cross section view of a stripping end of a stripping tool having a retention element configured as a cleat according to one or more embodiments described and illustrated herein.
Figure 10B:
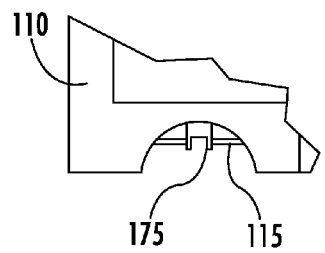
FIG. 10B schematically depicts a partial side view of a stripping end of a stripping tool wherein the retention element is configured as a cleat having two prongs according to one or more embodiments described and illustrated herein.
Figure 10D:
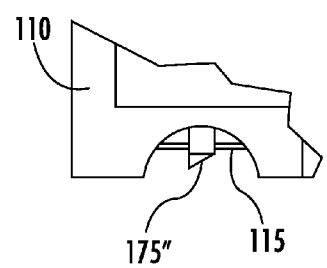
FIG. 10D schematically depicts a partial side view of a stripping end of a stripping tool wherein the retention element is configured as a cleat having and angled blade according to one or more embodiments described and illustrated herein.
Figure 10C:
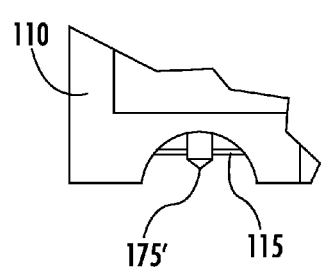
FIG. 10C schematically depicts a partial side view of a stripping end of a stripping tool wherein the retention element is configured as a cleat having a conical end according to one or more embodiments described and illustrated herein.

Other retention element configurations are also possible. FIG. 10A schematically depicts a stripping tool 100" in cross section wherein the retention element is configured as a cleat 175 extending from an upper surface of the insert 110 (or from the body portion 105 in embodiments that do not utilize an insert 110). The cleat 175 may be configured as any feature capable of contacting the outer layer 1050 of the coaxial cable 1000 to impart a twisting action to cable remnant 1080. FIG. 10B depicts a partial side view of the stripping tool 100" depicted in FIG. 10A. As shown in FIG. 10B, the cleat 175 is configured as having two prongs to pierce the outer layer 1050 of the coaxial cable 1000 and prevent rotation of the cable remnant 1080. The cleat 175 may take on other forms, such as having a conical tip (e.g., cleat 175' of FIG. 10C) or having an angled blade (e.g., cleat 175" of FIG. 10D).

It should now be understood that embodiments described herein are directed to tools and methods for stripping a preparing a coaxial cable without requiring that the braided connector be exposed and peeled back on an outer layer (i.e., outer jacket) of the coaxial cable. According to the tools and methods described herein, only the inner conductor is exposed in the stripped portion of the coaxial cable following the cable stripping process. More specifically, the coaxial cable is positioned between a clamping arm and a body portion of a stripping tool such that a stripping blade enters the insulator layer. The stripping tool is rotated about the coaxial cable while rotation of an end portion of the coaxial cable within the stripping tool is prevented such that a bond between the insulator layer and the inner conductor is broken, and the stripping blade circumferentially severs the outer layer, the braided outer conductor layer, and the insulator layer. An end remnant of the coaxial cable is separated from the coaxial cable to expose the inner conductor for a desired length. In some embodiments, a chamfer may be formed in the outer layer of the coaxial cable.

For the purposes of describing and defining the subject matter of the disclosure it is noted that the term "substantially" is utilized herein to represent the inherent degree of uncertainty that may be attributed to any quantitative comparison, value, measurement, or other representation.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the disclosure. Since modifications, combinations, sub-combinations and variations of the disclosed embodiments incorporating the spirit and substance of the disclosure may occur to persons skilled in the art, the embodiments disclosed herein should be construed to include everything within the scope of the appended claims and their equivalents.

What is claimed is:

1. A stripping tool for stripping a coaxial cable comprising an inner conductor, an insulator layer surrounding the inner conductor, a braided outer conductor layer surrounding the insulator layer, and an outer layer surrounding the braided outer conductor layer, the stripping tool comprising:
 a body portion comprising a stripping end;
 a clamping arm rotatably coupled to the body portion such that the clamping arm is biased in a normally closed position with respect to the body portion;
 a stripping blade comprising a blade edge, wherein the stripping blade extends from the body portion at the stripping end in a direction toward the clamping arm, and the blade edge is offset from the clamping arm at a distance (d) such that the blade edge enters the insulator layer of the coaxial cable when the coaxial cable is positioned between the clamping arm and the body portion and the stripping tool is in a closed position; and
 a retention element disposed at the body portion at a position after the stripping blade along a cable insertion direction, wherein:
 the retention element and the clamping arm define a channel when the stripping tool is in the closed position; and
 the retention element is positioned to contact the outer layer of an end portion of the coaxial cable when the coaxial cable is positioned between the clamping arm and the body portion and the stripping tool is in the closed position such that the retention element prevents rotation of the end portion of the coaxial cable within the stripping tool as the stripping tool is rotated about the coaxial cable.

2. The stripping tool of claim 1, wherein the retention element prevents rotation of the end portion of the coaxial cable such that a bond between the insulator layer and the inner conductor is broken as the stripping tool is rotated about the coaxial cable.

3. The stripping tool of claim 1, wherein the retention element comprises a pad.

4. The stripping tool of claim 3, wherein the pad is curved.

5. The stripping tool of claim 3, wherein the pad is made of a pliable material.

6. The stripping tool of claim 3, wherein the pad is made of reinforced silicon.

7. The stripping tool of claim 1, wherein the retention element is curved and comprises a textured surface.

8. The stripping tool of claim 7, wherein the textured surface is a knurl pattern.

9. The stripping tool of claim 1, wherein the retention element comprises a cleat extending from the body portion toward the clamping arm.

10. The stripping tool of claim 9, wherein the cleat is configured to pierce at least the outer layer of the coaxial cable.

11. The stripping tool of claim 1, wherein the clamping arm comprises a groove aligned with the retention element when the stripping tool is in a closed position.

12. The stripping tool of claim 1, wherein the blade edge of the stripping blade comprises a central notch.

13. The stripping tool of claim 1, wherein the stripping blade comprises a chamfer feature configured to form a chamfered end face of the coaxial cable as the stripping tool is rotated about the coaxial cable.

14. The stripping tool of claim 13, wherein the stripping blade further comprises a face, and the chamfer feature comprises an angled portion extending from the face.

15. The stripping tool of claim 1, further comprising an insert removably coupled to the body portion, wherein the stripping blade and the retention element are disposed within the insert.

16. A stripping tool for stripping a coaxial cable comprising an inner conductor, an insulator layer surrounding the inner conductor, a braided outer conductor layer surrounding the insulator layer, and an outer layer surrounding the braided outer conductor layer, the stripping tool comprising:
 a body portion comprising a stripping end;
 a clamping arm rotatably coupled to the body portion such that the clamping arm is biased in a normally closed position with respect to the body portion; and
 an insert removably coupled to the body portion at the stripping end, the insert comprising:
  a stripping blade comprising a blade edge, wherein the stripping blade extends toward the clamping arm such that the blade edge is offset from the clamping arm at a distance (d) and the blade edge enters the insulator layer of the coaxial cable when the coaxial cable is positioned between the clamping arm and the body portion and the stripping tool is in a closed position; and
  a retention pad disposed at the body portion at a position after the stripping blade along a cable insertion direction, wherein:
   the retention pad is curved;
   the retention pad and the clamping arm define a channel when the stripping tool is in the closed position; and
   the retention pad is positioned within the insert to contact the outer layer of an end portion of the coaxial cable when the coaxial cable is positioned between the clamping arm and the body portion and the stripping tool is in the closed position such that the retention pad prevents rotation of the end portion of the coaxial cable within the stripping tool and a bond between the insulator layer and the inner conductor is broken as the stripping tool is rotated about the coaxial cable.

17. The stripping tool of claim 16, wherein the blade edge of the stripping blade comprises a central notch.

18. The stripping tool of claim 16, wherein the stripping blade comprises a chamfer feature configured to form a chamfered end face of the coaxial cable as the stripping tool is rotated about the coaxial cable.

19. The stripping tool of claim 18, wherein the stripping blade further comprises a face, and the chamfer feature comprises an angled portion extending from the face.

* * * * *